(12) United States Patent
Zhang et al.

(10) Patent No.: US 11,790,037 B1
(45) Date of Patent: Oct. 17, 2023

(54) DOWN-SAMPLING OF NEGATIVE SIGNALS USED IN TRAINING MACHINE-LEARNED MODEL

(71) Applicant: Microsoft Technology Licensing, LLC, Redmond, WA (US)

(72) Inventors: Xiaowen Zhang, Santa Clara, CA (US); Girish Kathalagiri Somashekariah, Santa Clara, CA (US); Samaneh Abbasi Moghaddam, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1,113 days.

(21) Appl. No.: 16/366,977

(22) Filed: Mar. 27, 2019

(51) Int. Cl.
| | | |
|---|---|---|
| *G06F 16/00* | (2019.01) | |
| *G06F 9/30* | (2018.01) | |
| *G06F 16/9538* | (2019.01) | |
| *G06F 16/903* | (2019.01) | |
| *G06N 20/00* | (2019.01) | |
| *G06F 18/2113* | (2023.01) | |

(52) U.S. Cl.
CPC ........ *G06F 18/2113* (2023.01); *G06F 9/30069* (2013.01); *G06F 16/90335* (2019.01); *G06F 16/9538* (2019.01); *G06N 20/00* (2019.01)

(58) Field of Classification Search
CPC ............... G06F 16/90335; G06F 16/9538
See application file for complete search history.

(56) References Cited

U.S. PATENT DOCUMENTS

| | | | |
|---|---|---|---|
| 10,417,650 B1* | 9/2019 | Gong | G06Q 30/0202 |
| 10,607,189 B2 | 3/2020 | Kenthapadi et al. | |
| 10,679,187 B2 | 6/2020 | Kenthapadi et al. | |
| 2009/0106221 A1* | 4/2009 | Meyerzon et al. | G06F 16/951 707/999.005 |
| 2010/0324970 A1 | 12/2010 | Phelon et al. | |
| 2013/0246412 A1* | 9/2013 | Shokouhi et al. | G06F 16/9535 707/E17.084 |
| 2014/0089241 A1 | 3/2014 | Hoffberg et al. | |
| 2015/0082277 A1 | 3/2015 | Champlin-Scharff et al. | |
| 2016/0034852 A1 | 2/2016 | Kapur et al. | |
| 2016/0196491 A1 | 7/2016 | Chandrasekaran et al. | |
| 2016/0292288 A1 | 10/2016 | Walton et al. | |
| 2016/0350401 A1* | 12/2016 | Wang et al. | G06F 16/3326 |

(Continued)

OTHER PUBLICATIONS

"Final Office Action Issued in U.S. Appl. No. 16/366,964", Mailed Date: Mar. 30, 2021, 20 Pages.
"Non Final Office Action Issued in U.S. Appl. No. 16/366,964", Mailed Date: Nov. 2, 2020, 15 Pages.
"Non Final Office Action Issued in U.S. Appl. No. 16/366,964", Mailed Date: Sep. 22, 2021, 19 Pages.
"Notice of Allowance Issued in U.S. Appl. No. 16/366,964", Mailed Date: Dec. 6, 2021, 11 Pages.
"Notice of Allowance Issued in U.S. Appl. No. 16/366,990", Mailed Date: May 11, 2022, 13 Pages.

(Continued)

*Primary Examiner* — Khanh B Pham
(74) *Attorney, Agent, or Firm* — Schwegman, Lundberg & Woessner, P.A.

(57) ABSTRACT

In an example embodiment, a skip logic using downsampling is applied to negative signals on a training data set fed to a machine-learning algorithm to train a machine-learned model. By downsampling the negatively labeled pieces of training data, the technical problem encountered in biasing the machine-learned model towards negative cases is overcome.

17 Claims, 12 Drawing Sheets

(56) References Cited

U.S. PATENT DOCUMENTS

| | | | |
|---|---|---|---|
| 2017/0255906 A1* | 9/2017 | Le et al. | ............. G06F 16/9535 |
| 2017/0364867 A1 | 12/2017 | Potratz et al. | |
| 2018/0189292 A1* | 7/2018 | Grace, Jr. et al. | . G06F 16/24578 |
| 2018/0197090 A1* | 7/2018 | Yates et al. | ......... G06Q 30/0241 |
| 2018/0218327 A1 | 8/2018 | Kenthapadi et al. | |
| 2018/0315019 A1 | 11/2018 | Kenthapadi et al. | |
| 2019/0019157 A1 | 1/2019 | Saha et al. | |
| 2019/0034792 A1 | 1/2019 | Kataria et al. | |
| 2019/0034882 A1 | 1/2019 | Saha et al. | |
| 2019/0050750 A1 | 2/2019 | Le et al. | |
| 2019/0356555 A1 | 11/2019 | Bai | |
| 2021/0216936 A1 | 7/2021 | Kavumpurath | |

OTHER PUBLICATIONS

Jeffrey, et al., "BugFix: A Learning-based Tool to Assist Developers in Fixing Bugs", In Proceedings of the IEEE 17th International Conference on Program Comprehension, May 17, 2009, pp. 70-79.

Kim, et al., "Where Should We Fix This Bug? A Two-Phase Recommendation Model", In IEEE Transactions on Software Engineering, Volume 39, Issue 11, Nov. 2013, pp. 1597-1610.

Kulesza, et al., "Principles of Explanatory Debugging to Personalize Interactive Machine Learning", In Proceedings of the 20th International Conference on Intelligent User Interfaces, Mar. 29, 2015, pp. 126-137.

Patel, et al., "Investigating Statistical Machine Learning as a Tool for Software Development", In Proceedings of the SIGCHI Conference on Human Factors in Computing Systems, Apr. 5, 2008, pp. 667-676.

Zhang, et al., "GLMix: Generalized Linear Mixed Models for Large-Scale Response Prediction", In Proceedings of the 22nd ACM SIGKDD International Conference on Knowledge Discovery and Data Mining, Aug. 13, 2016, pp. 363-372.

* cited by examiner

LEGAL SECRETARY
JOE & BLO - SAN FRANCISCO, CA
POSTED 6 DAYS AGO - 🕐 BE AMONG THE FIRST 25

[ SAVE ]  [ 📅 EASY APPLY ]

THE SAN FRANCISCO OFFICE OF A REPUTABLE BOUTIQUE LAW FIRM IS SEEKING AN EXPERIENCED LITIGATION SECRETARY. THE IDEAL CANDIDATE WILL HAVE A MINIMUM OF FIVE YEARS EXPERIENCE WITHIN...

KNOWLEDGE SKILLS AND EXPERIENCE
- MUST HAVE A MINIMUM 5 YEARS OF
- KNOWLEDGE OF STATE AND FEDERAL
- ABILITY TO PREPARE DOCUMENTS, FORMS

ATTORNEYS
- PREPARE DISCOVERY REQUESTS AND
- ABILITY TO CALENDAR DEADLINES AND
- EXCELENT VERBAL AND WRITTEN COMMUNI
- STRONG PROFREADING GRAMMAR AND
- POSSESS STRONG TECHNICAL AND COMPUTER
- CAPABLE OF MULTYI-TASKING WITH A
- ABILITY TO WORK IN A TEAM ENVIRONMENT
- ABILITY TO PREPARE AND FINALIZE LAW FIRM

WE OFFER A PROFESSIONAL FRIENDLY AND COLLABORATIVE COMPENSATION AND EXCELLENT BENEFITS. PLEASE SUBMIT A RESUME AND A COVER LETTER. WE LOOK FORWARD TO MEETING OUR NEW TEAMMATE!

PRINCIPALS ONLY, NO THIRD PARTY CALLS.

HOW YOU MATCH
CRITERIA PROVIDED...
SKILLS
✓ LAW
✓ LITIGATION
○ ACCOUNTS PAYABLE
○ WRITTEN COMMUNICATION
○ ELECTRONIC FILING
○ CLERICAL SKILLS
○ OFFICE ADMINISTRATION
○ CLIENT BILLING
○ PROOFREADING
○ TEAMWORK

CONTACT THE JOB POSTER
JOE B
SENIOR COUNSEL

PREMIUM
SEND INMAIL

JOB DETAILS

SENIORITY LEVEL
MID-SENIOR LEVEL

INDUSTRY
LAW PRACTICE

EMPLOYMENT TYPE
FULL-TIME

JOB FUNCTIONS
ADMINISTRATIVE LEGAL

SEE LESS ∧

FIG. 9

DOWN-SAMPLING OF NEGATIVE SIGNALS USED IN TRAINING MACHINE-LEARNED MODEL

TECHNICAL FIELD

The present disclosure generally relates to technical problems encountered in the training of machine-learned models. More specifically, the present disclosure relates to the down-sampling of negative signals used in training a machine-learned model.

BACKGROUND

The rise of the Internet has occasioned an increase in the use of these online services to perform searches for jobs that have been posted on or linked to by the online services.

These job searches may either be performed explicitly by, for example, a user typing in a search query looking for particular jobs, or implicitly, by presenting the user with job listings the system thinks the user will be interested in. The latter may be presented in an area of a graphical user interface termed "Jobs You May Be Interested In."

In either the implicit or explicit case, results are presented based on scoring of potential results using a machine-learned model. In the case of explicit searches, the explicit search query is a large factor in the scoring of the results (which would evaluate match features such as how often terms that appear in the query appear in the results). In the case of implicit searches, match features are not used as no explicit search query is provided, but other features may be evaluated to score the results. These include global features, per-user features, and per-job features.

These features are typically extracted from training data, which may include, for example, user information such as information extracted from a user profile as well as interaction information indicating some sort of interaction by each user with one or more job postings that are also part of the training data. A graphical user interface, such as a web page, may be designed to allow for users to interact with the job postings either explicitly or implicitly, in both positive and negative ways. For example, explicit buttons may be provided in the graphical user interface for the user to save a job posting or apply to a job posting (both of which would be considered positive explicit signals, although possibly weighted differently). Another explicit button may be provided in the graphical user interface for the user to indicate that the job posting is not for them, which would be considered a negative explicit signal.

Some models permit training based on implicit interaction signals. An example of a positive implicit interaction signal is viewing a job posting for a certain period of time. While this may not indicate strong interest in the job posting, it may be assumed that the job posting provided some level of interest in the job posting enough for it to be considered in a machine-learned model as positive feedback for that particular job posting (albeit perhaps weighted less heavily than an explicit positive signal). An example of a negative implicit interaction signal is the skipping over of job postings in the graphical user interface. For example, twelve job postings may be displayed in the graphical user interface at once, and the user may choose to apply to the 1$^{st}$, 4$^{th}$, and 9$^{th}$ job posting. This can imply that the user deliberately skipped over the 2$^{nd}$, 3$^{rd}$, and 5$^{th}$ through 8$^{th}$ job postings, and thus this interaction may be viewed as negative implicit interaction signals for those job postings (although, again, perhaps weighted less heavily than a negative explicit interaction signal such as selecting "not for me" on the job postings).

A technical problem is encountered, however, in using such negative interaction signals in the training of a machine learned model, and specifically in using the "skip" interaction in such training. Specifically, there may be a significant number of "skipped" job postings for each user, given that users are typically somewhat picky in their job searches. The result is that a machine learned model trained using such "skip" interactions tend to be biased towards the negative, meaning that he majority of job postings presented to users are treated as negative interactions. This causes the machine learned model to eventually decay to a point where very few or even no job postings are presented to a user, as the system assumes that the user is uninterested in most job postings.

BRIEF DESCRIPTION OF THE DRAWINGS

Some embodiments of the technology are illustrated, by way of example and not limitation, in the figures of the accompanying drawings.

FIG. 6 is a screen capture illustrating an example graphical user interface rendered as a result of selecting a job posting, in accordance with an example embodiment.

FIG. 7 is a screen capture illustrating the graphical user interface including the launched overlay window.

FIG. 9 is a screen capture illustrating the treatment of the top three job postings, in accordance with an example embodiment.

DETAILED DESCRIPTION

Overview

In an example embodiment, a skip logic using downsampling is applied to negative signals on a training data set fed to a machine-learning algorithm to train a machine-learned model. By downsampling the negatively labeled pieces of training data, the technical problem encountered in biasing the machine-learned model towards negative cases is overcome.

Description

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a skip logic is utilized to identify pieces of training data to be used as negatively labeled training data through implicit action of users in a graphical user interface. This skip logic utilizes downsampling to limit the number of such negatively labeled pieces of training data to a level lower than would have been achieved if the skip logic were implemented without the downsampling.

In an example embodiment, the down-sampling is performed on a per-session basis. In other words, for each session, a total number of implicitly negatively labeled pieces of training data (by virtue of a skip interaction) are identified. This total number of implicitly negatively labeled pieces of training data is then downsampled according to a downsampling scheme. For example, the downsampling scheme may be set to downsample the implicitly negatively labeled pieces of training data so that the resulting implicitly negatively labeled pieces of training data are 10% of the original implicitly negatively labeled pieces of training data, rounded up to the nearest integer. So if there are originally 5 pieces of implicitly negatively labeled pieces of training data, then the result of the downsampling will be 1 implicitly negatively labeled piece of training data. Likewise, if there are originally 10 pieces of implicitly negatively labeled pieces of training data, then the result of the downsampling will be 1 implicitly negatively labeled piece of training data. Likewise, if there are originally 15 pieces of implicitly negatively labeled pieces of training data, then the result of the downsampling will be 2 implicitly negatively labeled pieces of training data. The resulting labeled pieces of training data may be used to train the machine learned model.

Figure 1:
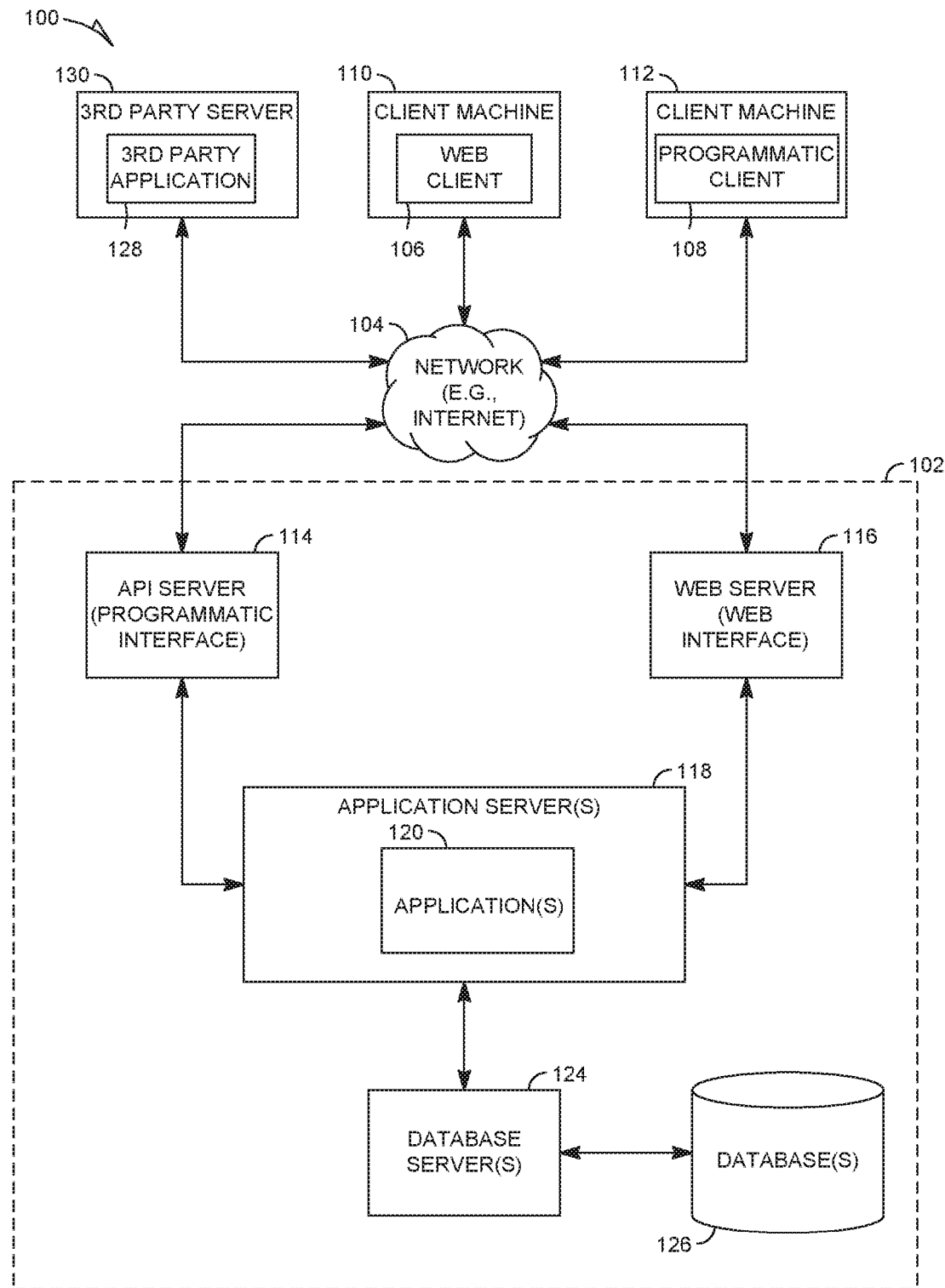
FIG. 1 is a block diagram illustrating a client-server system 100, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
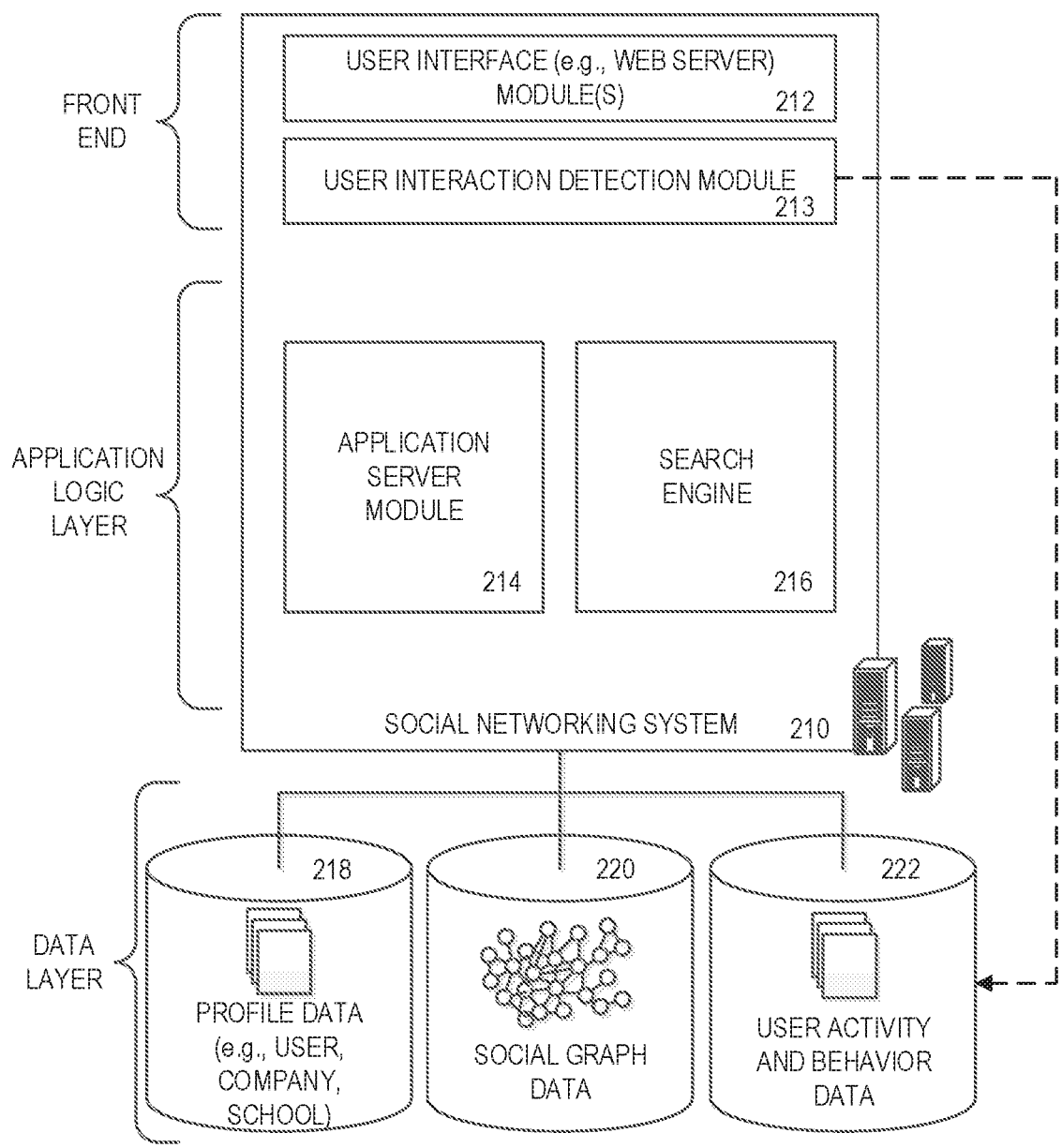
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family users' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, or relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
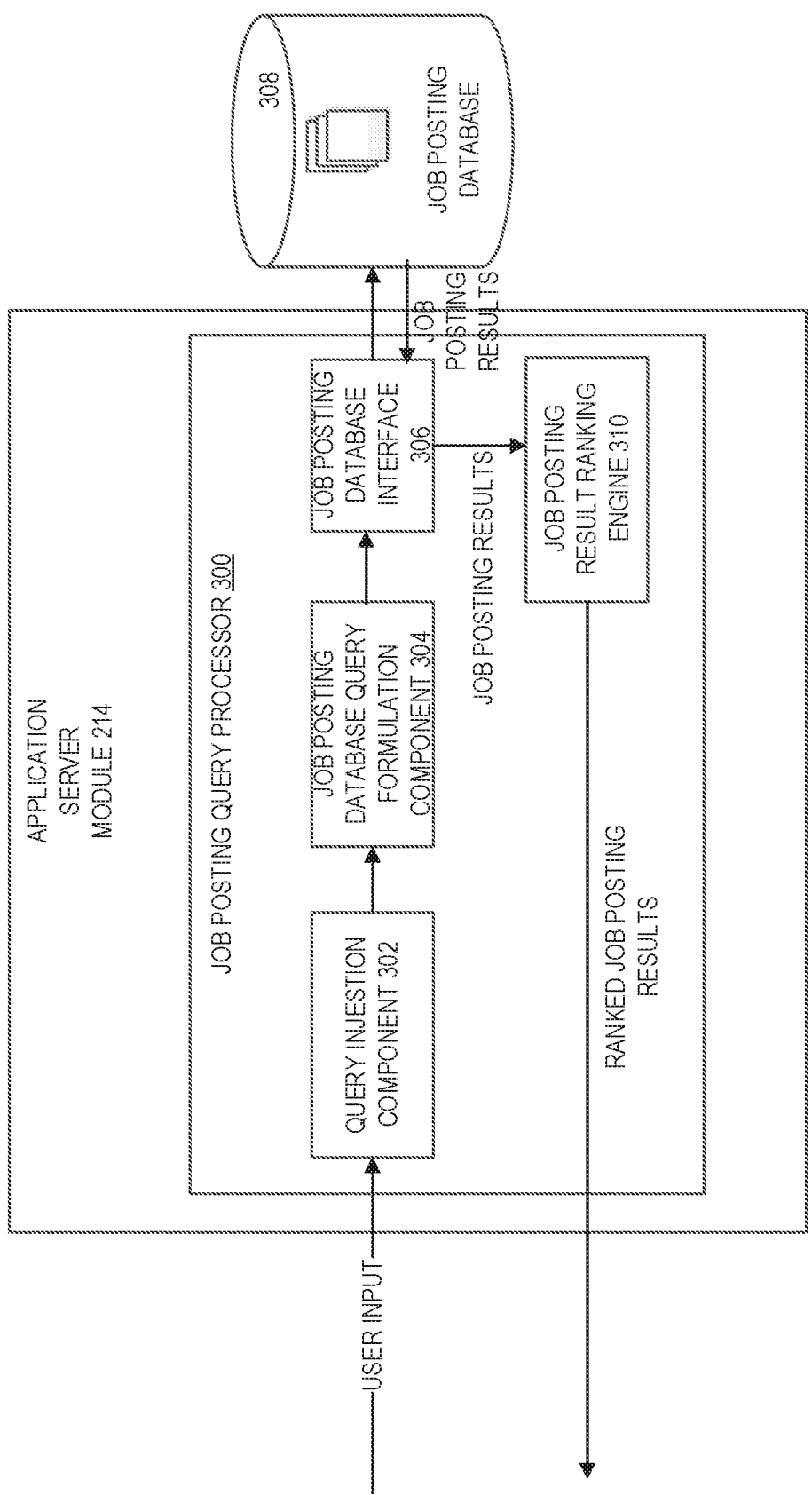
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While, in many embodiments, the application server module 214 will contain many subcomponents used to perform various different actions within the social networking system 210, in FIG. 3 only those components that are relevant to the present disclosure are depicted. A job posting query processor 300 comprises a query injection component 302, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other users or entities, etc.

This "query" may be sent to a job posting database query formulation component 304, which formulates an actual job posting database query, which will be sent, via a job posting database interface 306, to job posting database 308. Job posting results responsive to this job posting database query may then be sent to the job posting result ranking engine 310, again via the job posting database interface 306. The job posting result ranking engine 310 then ranks the job posting results and sends the ranked job posting results back to the user interface for display to the user.

Figure 4:
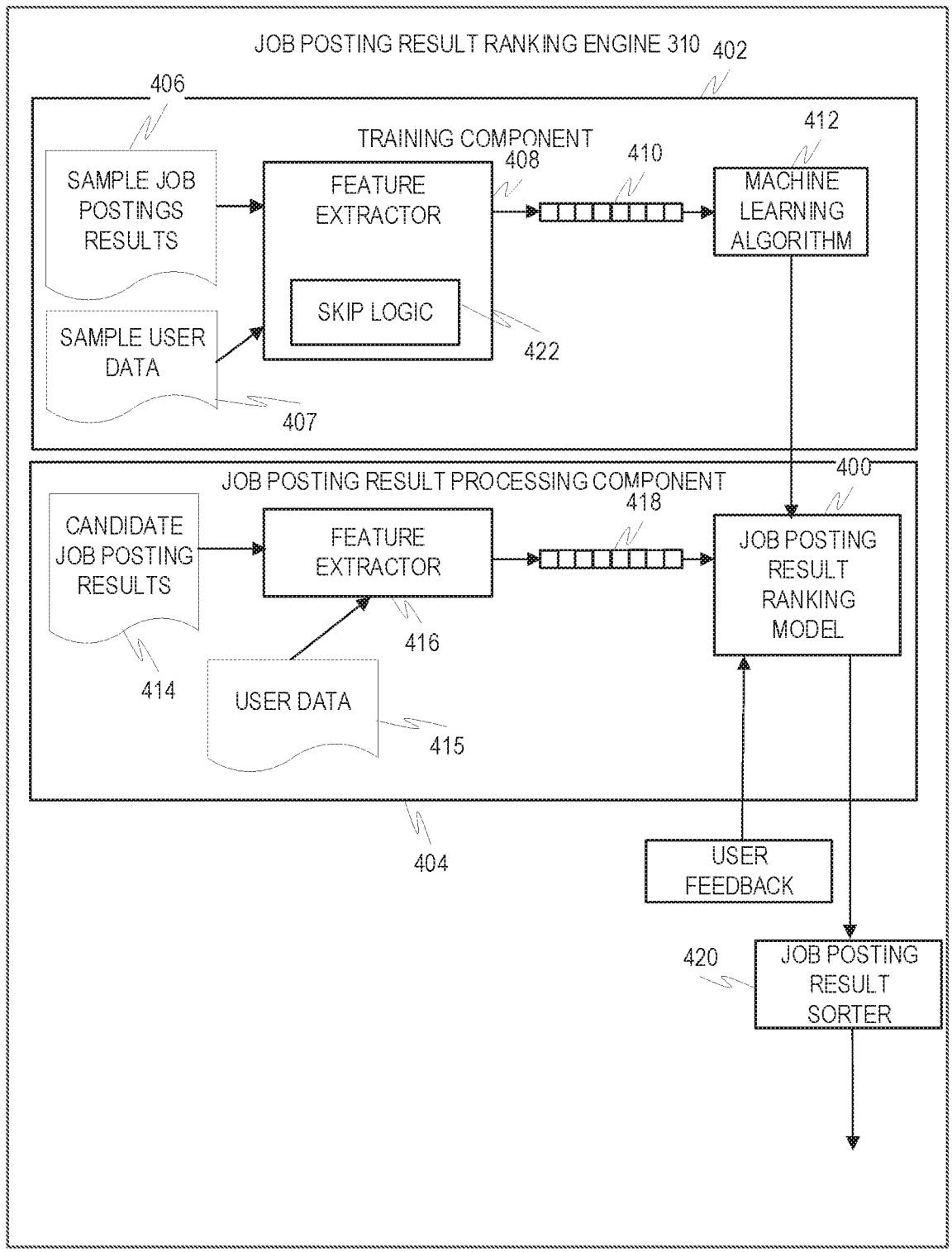
FIG. 4 is a block diagram illustrating a job posting result ranking engine of FIG. 3 in more detail, in accordance with an example embodiment.

FIG. 4 is a block diagram illustrating job posting result ranking engine 310 of FIG. 3 in more detail, in accordance with an example embodiment. The job posting result ranking engine 310 may use machine learning techniques to learn a job posting result ranking model 400, which can then be used to rank actual job posting results from the job posting database 308.

. The job posting result ranking engine 310 may comprise a training component 402 and a job posting result processing component 404. The training component 403 feeds sample job postings results 406 and sample user data 407 into a feature extractor 408 that extracts one or more features 410 for the sample job postings results 406 and sample user data 407. The sample job postings results 406 may each include job postings results produced in response to a particular query as well as one or more labels, such as a j ob posting application likelihood score, which is a score indicating a probability that a user with a corresponding sample user data 407 will apply for the job associated with the corresponding sample job postings result 406.

Sample user data 407 may include, for example, a history of job searches and resulting expressions of interest (such as clicking on job posting results or applications to corresponding jobs) in particular job posting results for particular users. In some example embodiments, sample user data 407 can also include other data relevant for personalization of the query results to the particular user, such as a user profile for the user or a history of other user activity.

A machine learning algorithm 412 produces the job posting result ranking model 400 using the extracted features 410 along with the one or more labels. In the job posting result processing component 404, candidate job postings results 414 resulting from a particular query are fed to a feature extractor 416 along with a candidate user data 415. The feature extractor 416 extracts one or more features 418 from the candidate job postings results 414 and candidate user data 415. These features 418 are then fed to the job posting result ranking model 400, which outputs a job posting application likelihood score for each candidate job postings result for the particular query.

This job posting application likelihood score for each candidate job posting result may then be passed to a job posting result sorter 420, which may sort the candidate job postings results 414 based on their respective job posting application likelihood scores.

It should be noted that the job posting result ranking model 400 may be periodically updated via additional training and/or user feedback. The user feedback may be either feedback from users performing searches, or from companies corresponding to the job postings. The feedback may include an indication about how successful the job posting result ranking model 400 is in predicting user interest in the job posting results presented.

The machine learning algorithm 412 may be selected from among many different potential supervised or unsupervised machine learning algorithms 412. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

As described above, in an example embodiment, a skip logic 422 is utilized to identify pieces of training data to be used as negatively labeled training data through implicit action of users in a graphical user interface 500. This skip logic 422 utilizes downsampling to limit the number of such negatively labeled pieces of training data to a level lower than would have been achieved if the skip logic 422 were implemented without the downsampling.

In this example figure, the skip logic 422 is depicted as being included in the feature extractor 408, although in some example embodiments the skip logic 422 may be located in a separate component.

This skip logic 422 will be described in terms of interactions between users and job postings via a graphical user interface 500, but one of ordinary skill in the art will recognize that the skip logic 422 can be extended to other types of interactions as well, such as between users and other forms of search results or visual items.

The skip logic 422 may further be implemented in a number of different ways even to arrive at the original total number of implicitly negatively labeled job postings in the training data.

Figure 5:
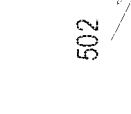
FIG. 5 is a screen capture illustrating an example graphical user interface, in accordance with an example embodiment.

In an example embodiment, job postings displayed between job postings having positive interactions in the graphical user interface are considered to be "skips" and included in the total number of skipped job postings for the session. FIG. 5 is a screen capture illustrating an example graphical user interface 500 in accordance with an example embodiment. Here, the graphical user interface 500 displays a number of job postings, including job posting 502. The user of the graphical user interface 500 may interact with a job posting 502 in a number of different ways. The user may select the job posting 502 by performing a "clicking" action on the job posting 502. This may launch a separate window that displays details about the job posting 502. FIG. 6 is a screen capture illustrating an example graphical user interface 600 rendered as a result of selecting a job posting in accordance with an example embodiment. Here, the graphical user interface 600 displays more detail about the job posting, and also includes two buttons 602, 604. Button 602 is a "save" button which, when selected by the user, causes the job posting to be saved in a list that the user can refer to later. Button 604 is an "easy apply" button which, when selected by the user, causes an application for employment to be sent to the employer corresponding to the job posting 502. Both of these buttons 602, 604 are such that, if selected, they reflect an explicit positive interaction with the job posting.

Figure 7:
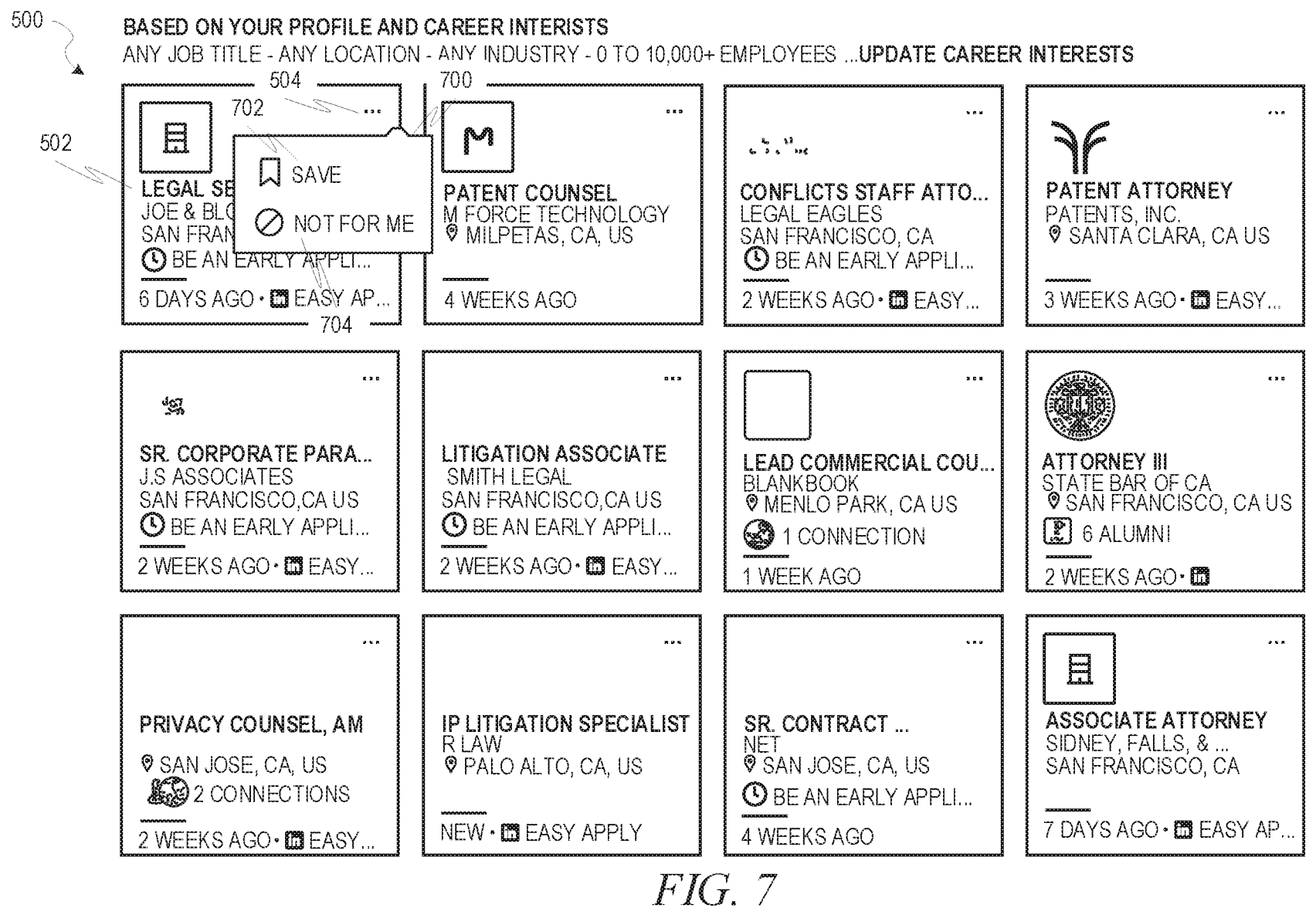

Referring back to FIG. 5, the graphical user interface 500 includes an action button 504. This may launch an overlay window offering additional actions for the user to take. FIG. 7 is a screen capture illustrating the graphical user interface 500 including the launched overlay window 700. This launched overlay window 700 includes two buttons 702, 704. A "save" button 702 operates the same way as button 602 in FIG. 6. A "not for me" button 704 indicates that the user is not interested in the job posting 504, and thus is an explicit negative interaction.

As described earlier, job postings that are not interacted with but that are between two positively interacted with job postings may be considered implicit negative interactions as "skips." In some example embodiments, other rules may also be applied to add or remove what job postings are considered as skips.

Figure 8:
FIG. 8 is a screen capture illustrating the skipping of job postings before interacted job postings, in accordance with an example embodiment.

A first of these rules may be that all job postings displayed before and between job postings having positive interactions in the graphical user interface are considered to be "skips" and included in the total number of skipped job postings for the session. Thus, instead of just the non-interacted job postings between interacted job postings, ones before the interacted job postings are considered skips as well. FIG. 8 is a screen capture illustrating the skipping of job postings before interacted job postings in accordance with an example embodiment. It should be noted that the graphical user interface 800 in this figure operates the same as the graphical user interface 500 in FIGS. 5 and 7, but here positive or negative markers are depicted for purposes of understanding. These positive or negative markers are not visible in the graphical user interface 800 displayed on the screen. Here, for example, j ob posting 502 as well as job postings 802-810 were not interacted with, but job posting 812 was interacted with in a positive way (through a "save" action or an "apply" action, for example). The results is that job posting 812 is considered a positive piece of training data while job postings 504 and 802-810 are considered as negative pieces of training data (subject to the downsampling described earlier).

In another optional additional embodiment, if a positive interactions occur in the first three job postings, then the remainder of the first three job postings are considered skips. FIG. 9 is a screen capture illustrating the treatment of the top three job postings in accordance with an example embodiment. Here, job posting 502 was positively interacted with but no other job postings were interacted with in any way. Thus, the remainder of the top three job postings, namely job 802 and 804 are considered as negative pieces of training data (subject to the downsampling described earlier).

In another optional additional embodiment, no skips are generated for job postings where there are no interactions with any of the job postings displayed.

In some example embodiments, a minimum threshold of "dwell time" is used to eliminate job postings from being considered as "skips" when the user did not actually see them. Dwell time is an indicator of how much time has elapsed between a job posting being rendered in the graphical user interface (also known as impressed) and when the job posting is not visible anymore. For example, a user may accidentally double tap a "more results" button, which can cause a first screen of results to be displayed briefly before nearly immediately removing the first screen in lieu of a second screen of results. In such cases, the dwell time would be less than the predetermined threshold and thus the job postings on the first screen of results will not be treated as "skips."

Figure 10:
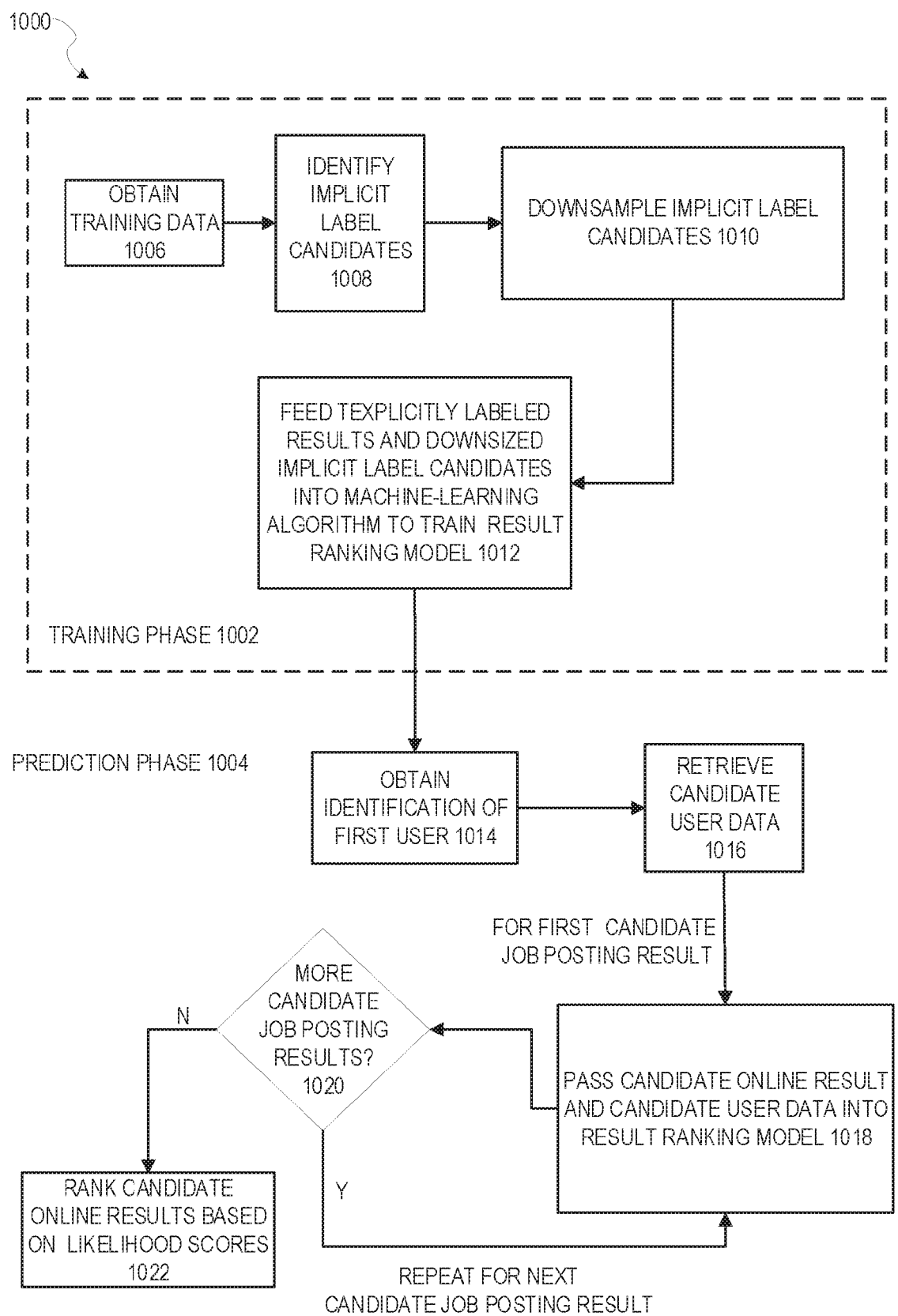
FIG. 10 is a flow diagram illustrating a method to sort candidate results in an online service, in accordance with an example embodiment.

FIG. 10 is a flow diagram illustrating a method 1000 to sort candidate results in an online service, in accordance with an example embodiment. This method 1000 may be divided into a training phase 1002 and a prediction phase 1004. In the training phase 1002, at operation 1006, training data pertaining to sample user profiles and corresponding results are obtained. These combinations reflect explicit actions taken by the users corresponding to the sample user profiles on the corresponding job postings. These actions may either be positive or negative, thus indicating positive or negative signals to the underlying machine learning algorithm that will utilize them. Positive signals may include, for example, applying for a job corresponding to a job posting or saving a job posting or negative signals such as dismissing a job (these actions all being taken in a corresponding graphical user interface by, for example, selecting explicit buttons corresponding to these actions). Negative signals may include, for example, selecting a "not for me" button on a job posting.

At operation 1008, one or more of the sample results not having indications that they were explicitly interacted with by users are identified as being implicit label candidates. At operation 1010, the implicit label candidates are downsampled according to a downsampling formula.

Then, at operation 1012, the explicitly labeled results and the downsized implicit label candidates are fed into a machine learning algorithm 412 to train a result ranking model 400 to output a likelihood score for a candidate result and candidate user data 415.

Turning to the prediction phase 1004, at operation 1014, an identification of a first user of the social networking service is obtained. At operation 1016, candidate user data 415 for the first user is retrieved using the identification. Then a loop is begun for each of a plurality of different candidate online results 414. At operation 1018, the candidate online result and the candidate user data 415 for the first user are passed to the result ranking model 400 to generate a likelihood score for the candidate result and the first user. At operation 1020, it is determined if there are any more candidate results 414. If so, then the method 1000 may loop back to operation 1018 for the next candidate result 414. If not, then at operation 1022, the plurality of different candidate results 414 are ranked based on the likelihood scores.

Figure 11:
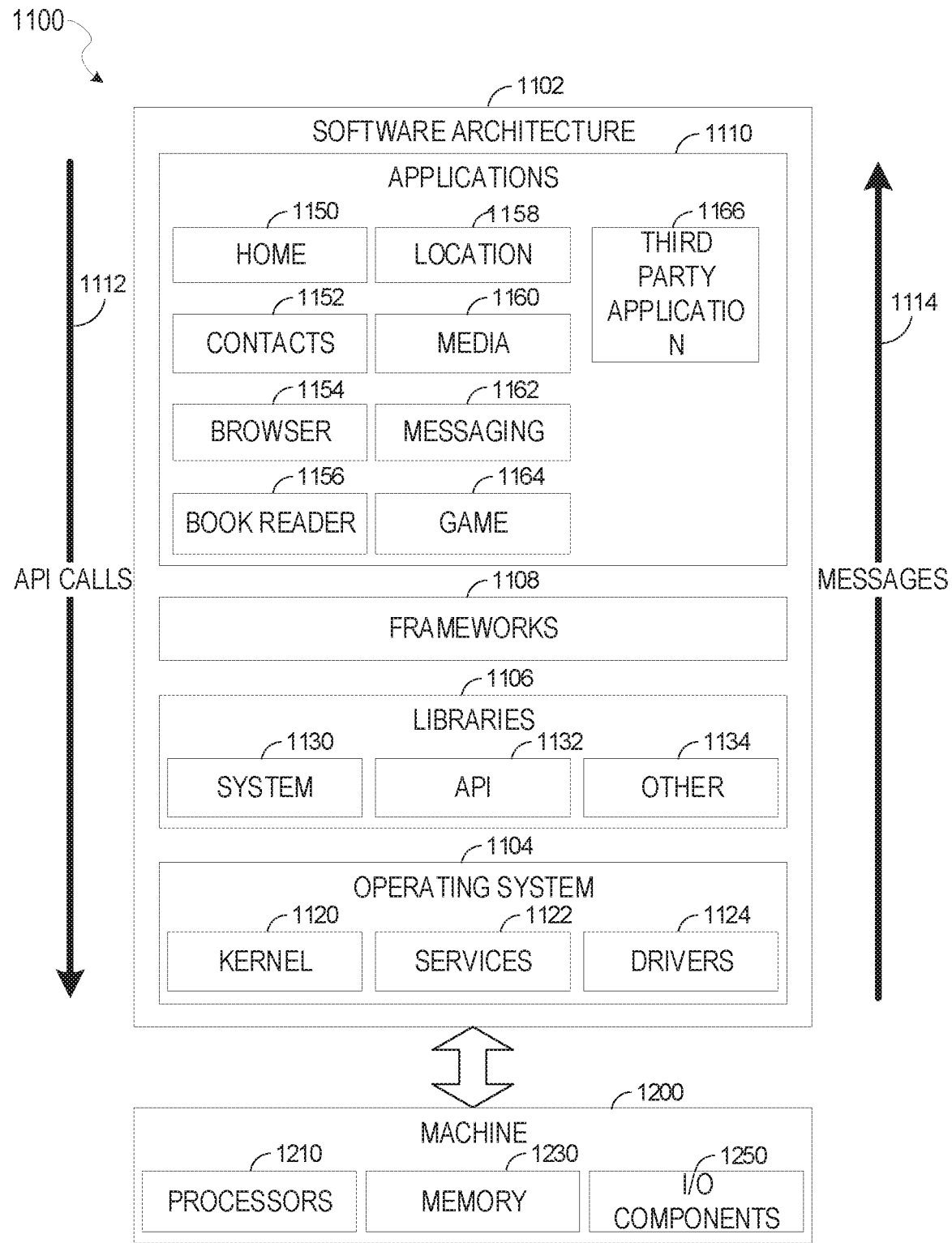
FIG. 11 is a block diagram illustrating a representative software architecture, which may be used in conjunction with various hardware architectures herein described.

FIG. 11 is a block diagram 1100 illustrating a software architecture 1 1 02, which can be installed on any one or more of the devices described above. FIG. 11 is merely a non-limiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example architecture, the software architecture 1102 can be conceptualized as a stack of layers where each layer may provide a particular functionality. For example, the software architecture 1 102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H0.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various GUI functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications, such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANTIROID™, WINDOWS® Phone, or another mobile operating system. In this example, the third-party application 1166 can invoke the API calls 1112 provided by the operating system 1104 to facilitate functionality described herein.

Figure 12:
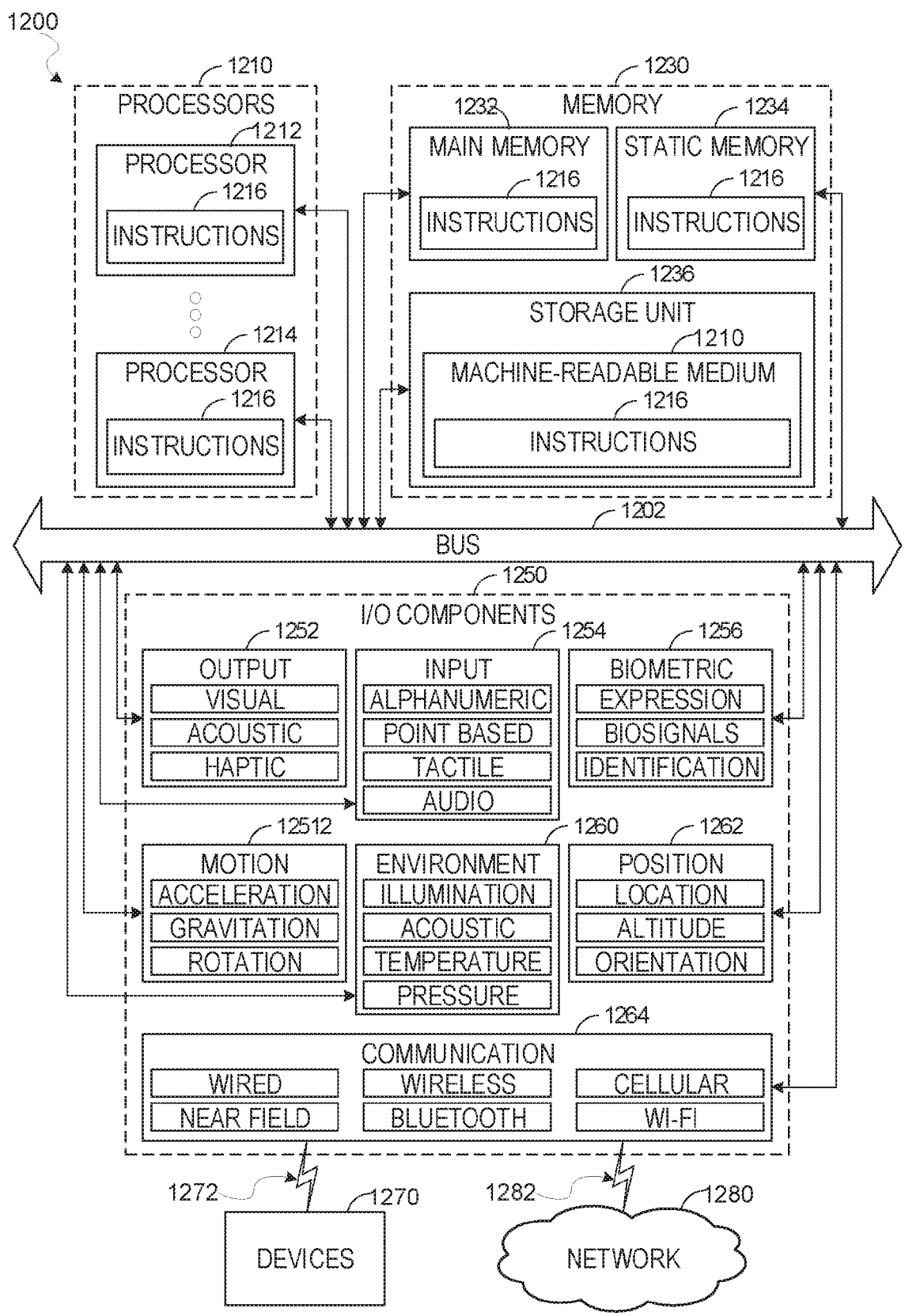
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein may be executed. For example, the instructions 1216 may cause the machine 1200 to execute the method 1000 of FIG. 10. Additionally, or alternatively, the instructions 1216 may implement FIGS. 1-10, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors 1212, 1214 (sometimes referred to as "cores") that may execute instructions 1216 contemporaneously. Although FIG. 12 shows multiple processors 1210, the machine 1200 may include a single processor 1212 with a single core, a single processor 1212 with multiple cores (e.g., a multi-core processor), multiple processors 1210 with a single core, multiple processors 1210 with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor 1212's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1257, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1257 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1230, 1232, 1234, and/or memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to the processors 1210. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks;

and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    a computer-readable medium having instructions stored thereon, which, when executed by a processor, cause the system to:
        in a training phase of a result ranking model:
            obtain training data pertaining to sample results and user data corresponding to users, the training data comprising indications as to which of the sample results were explicitly interacted with by which users;
            identify one or more of the sample results not having indications that they were explicitly interacted with by users as being implicit label candidates;
            downsample the implicit label candidates in accordance with a downsampling scheme, the downsampling scheme specifying that implicit label candidates are reduced to a percentage, specified by a downsampling formula, of the implicit label candidates, without reducing the sample results that were explicitly interacted with by users; and
            feed the sample results that were explicitly interacted with by users and the downsampled implicit label candidates into a machine learning algorithm to train the result ranking model to a likelihood score for a candidate result and candidate user data, the likelihood score indicating a likelihood that a user corresponding to the candidate user data will positively interact with the candidate result.

2. The system of claim 1, wherein the system is further caused to:
    in a prediction phase:
        obtain an identification of a first user of an online service;
        retrieve, using the identification, candidate user data for the first user;
        for each of a plurality of candidate online results, pass the candidate online result and the candidate user data for the first user to the result ranking model to generate a likelihood score for the result and the first user; and
        rank the plurality of online results based on the likelihood scores.

3. The system of claim 1, wherein the sample results and candidate result are job postings.

4. The system of claim 1, wherein the identifying includes identifying a sample result not having an indication that it were explicitly interacted with by a user as being an implicit label candidate if it was displayed in a graphical user interface in a location that is between two search results that were explicitly interacted with by the user.

5. The system of claim 4, wherein the identifying further includes identifying a sample result not having an indication that it were explicitly interacted with by a user as being an implicit label candidate if it was displayed in a graphical user interface in a location that is before a search result that was explicitly interacted with by the user.

6. The system of claim 4, wherein the identifying further includes identifying a sample result not having an indication that it were explicitly interacted with by a user as being an implicit label candidate if it was displayed in a graphical user interface in one of a first preset number of locations and at least one other result displayed in the first preset number of locations was explicitly interacted with by the user.

7. A computerized method, comprising in a training phase of a result ranking model:
    obtaining training data pertaining to sample results and user data corresponding to users, the training data comprising indications as to which of the sample results were explicitly interacted with by which users;

identifying one or more of the sample results not having indications that they were explicitly interacted with by users as being implicit label candidates;

downsampling the implicit label candidates in accordance with a downsampling scheme, the downsampling scheme specifying that implicit label candidates are reduced to a percentage, specified by a downsampling formula, of the implicit label candidates, without reducing the sample results that were explicitly interacted with by users; and feeding the sample results that were explicitly interacted with by users and the downsampled implicit label candidates into a machine learning algorithm to train the result ranking model to a likelihood score for a candidate result and candidate user data, the likelihood score indicating a likelihood that a user corresponding to the candidate user data will positively interact with the candidate result.

8. The method of claim 7, further comprising:
in a prediction phase:
obtaining an identification of a first user of an online service;
retrieving, using the identification, candidate user data for the first user;
for each of a plurality of candidate online results, passing the candidate online result and the candidate user data for the first user to the result ranking model to generate a likelihood score for the result and the first user; and
ranking the plurality of online results based on the likelihood scores.

9. The method of claim 7, wherein the sample results and candidate result are job postings.

10. The method of claim 7, wherein the identifying includes identifying a sample result not having an indication that it were explicitly interacted with by a user as being an implicit label candidate if it was displayed in a graphical user interface in a location that is between two search results that were explicitly interacted with by the user.

11. The method of claim 10, wherein the identifying further includes identifying a sample result not having an indication that it were explicitly interacted with by a user as being an implicit label candidate if it was displayed in a graphical user interface in a location that is before a search result that was explicitly interacted with by the user.

12. The method of claim 10, wherein the identifying further includes identifying a sample result not having an indication that it were explicitly interacted with by a user as being an implicit label candidate if it was displayed in a graphical user interface in one of a first preset number of locations and at least one other result displayed in the first preset number of locations was explicitly interacted with by the user.

13. A non-transitory machine-readable storage medium comprising instructions which, when implemented by one or more machines, cause the one or more machines to perform operations comprising:

in a training phase of a result ranking model:
obtaining training data pertaining to sample results and user data corresponding to users, the training data comprising indications as to which of the sample results were explicitly interacted with by which users;

identifying one or more of the sample results not having indications that they were explicitly interacted with by users as being implicit label candidates;

downsampling the implicit label candidates in accordance with a downsampling scheme, the downsampling scheme specifying that implicit label candidates are reduced to a percentage, specified by a downsampling formula, of the implicit label candidates, without reducing the sample results that were explicitly interacted with by users; and feeding the sample results that were explicitly interacted with by users and the downsampled implicit label candidates into a machine learning algorithm to train the result ranking model to a likelihood score for a candidate result and candidate user data, the likelihood score indicating a likelihood that a user corresponding to the candidate user data will positively interact with the candidate result.

14. The non-transitory machine-readable storage medium of claim 13, wherein the operations further comprise:
in a prediction phase:
obtaining an identification of a first user of an online service;
retrieving, using the identification, candidate user data for the first user;
for each of a plurality of candidate online results, passing the candidate online result and the candidate user data for the first user to the result ranking model to generate a likelihood score for the result and the first user; and
ranking the plurality of online results based on the likelihood scores.

15. The non-transitory machine-readable storage medium of claim 13, wherein the sample results and candidate result are job postings.

16. The non-transitory machine-readable storage medium of claim 13, wherein the identifying includes identifying a sample result not having an indication that it were explicitly interacted with by a user as being an implicit label candidate if it was displayed in a graphical user interface in a location that is between two search results that were explicitly interacted with by the user.

17. The non-transitory machine-readable storage medium of claim 16, wherein the identifying further includes identifying a sample result not having an indication that it were explicitly interacted with by a user as being an implicit label candidate if it was displayed in a graphical user interface in a location that is before a search result that was explicitly interacted with by the user.

* * * * *

UNITED STATES PATENT AND TRADEMARK OFFICE
CERTIFICATE OF CORRECTION

| | | |
|---|---|---|
| PATENT NO. | : 11,790,037 B1 | Page 1 of 1 |
| APPLICATION NO. | : 16/366977 | |
| DATED | : October 17, 2023 | |
| INVENTOR(S) | : Zhang et al. | |

It is certified that error appears in the above-identified patent and that said Letters Patent is hereby corrected as shown below:

In the Claims

In Column 17, Line 28, in Claim 8, delete "userto" and insert --user to-- therefor In Column 18, Line 34, in Claim 14, delete "userto" and insert --user to-- therefor Signed and Sealed this
Twenty-sixth Day of December, 2023

Katherine Kelly Vidal
*Director of the United States Patent and Trademark Office*